US007720455B2

(12) United States Patent
Anderton (10) Patent No.: US 7,720,455 B2
(45) Date of Patent: May 18, 2010

(54) SIDETONE GENERATION FOR A WIRELESS SYSTEM THAT USES TIME DOMAIN ISOLATION

(75) Inventor: David O. Anderton, Austin, TX (US)

(73) Assignee: ST-Ericsson SA, Geneva (CH)

( * ) Notice: Subject to any disclaimer, the term of this patent is extended or adjusted under 35 U.S.C. 154(b) by 992 days.

(21) Appl. No.: 11/479,080

(22) Filed: Jun. 30, 2006

(65) Prior Publication Data

US 2008/0039162 A1 Feb. 14, 2008

(51) Int. Cl.
*H04B 7/00* (2006.01)
(52) U.S. Cl. .................... 455/267; 455/702; 455/570
(58) Field of Classification Search ............. 455/550.1, 455/702, 73, 552.1, 556.1, 296, 267, 50.1, 455/462, 570, 90.1; 379/406.07, 391, 428.02, 379/406.13, 338; 370/310
See application file for complete search history.

(56) References Cited

U.S. PATENT DOCUMENTS 5,946,391 A * 8/1999 Dragwidge et al. ......... 379/391
6,151,391 A * 11/2000 Sherwood et al. ........... 379/391
6,643,617 B1 * 11/2003 Wood et al. ................. 704/226
2001/0033652 A1 * 10/2001 MacAuslan et al. .... 379/406.13
2002/0085707 A1 * 7/2002 Turnbull ................ 379/406.07
2006/0004938 A1 * 1/2006 Matthews et al. ........... 710/110
2006/0229028 A1 * 10/2006 Somayajula ................. 455/73
2007/0021958 A1 * 1/2007 Visser et al. ................ 704/226
2008/0080703 A1 * 4/2008 Penning et al. ......... 379/428.02

OTHER PUBLICATIONS

International Search report for Application No. PCT/US2007/072531, mailed Mar. 27, 2008, pp. 9.

* cited by examiner

*Primary Examiner*—Tan Trinh
(74) *Attorney, Agent, or Firm*—William J. Kubida; Peter J. Meza; Hogan & Hartson LLP (57) ABSTRACT

A technique includes providing a sidetone path to generate sidetone content in response to audio data and disabling at least part of the sidetone path during an active mode of a radio. The technique includes storing the sidetone content in an outgoing audio buffer that is operational during the active mode of the radio and establishing a delay in the sidetone path to prevent the outgoing audio buffer from being depleted of the sidetone content during the active mode of the radio.

23 Claims, 6 Drawing Sheets

SIDETONE GENERATION FOR A WIRELESS SYSTEM THAT USES TIME DOMAIN ISOLATION

BACKGROUND

The invention generally relates to sidetone generation for a wireless system that uses time domain isolation.

A typical wireless device, such as a cellular telephone, includes a radio frequency (RF) circuit, or radio, that establishes communication between the wireless device and a wireless network. The wireless device also typically includes digital circuitry for purposes of performing such functions as encoding/decoding data, compressing/de-compressing data, modulating/de-modulating data, scanning a keypad of the wireless device, etc.

SUMMARY

In an embodiment of the invention, a technique includes providing a sidetone path to generate sidetone content in response to audio data and disabling at least part of the sidetone path during an active mode of a radio. The technique includes storing the sidetone content in an outgoing audio buffer that is operational during the active mode of the radio and establishing a delay in the sidetone path to prevent the outgoing audio buffer from being depleted of the sidetone content during the active mode of the radio.

In another embodiment of the invention, a wireless system includes a radio, an outgoing audio buffer and a digital signal processor. The radio has an active mode and a de-activated mode. The outgoing audio buffer receives sidetone content from a sidetone path, and the sidetone content is generated by the digital signal processor. The digital signal processor does not generate the sidetone content during the active mode of the radio, and the digital signal processor is also adapted to introduce a delay in the sidetone path to prevent the outgoing audio buffer from being depleted of the sidetone content during the active mode of radio.

In another embodiment of the invention, an apparatus includes an audio buffer and a feedback path. The feedback path communicates feedback of audio data to the audio buffer and is at least partially disabled in response to an active mode of a radio. The feedback path introduces a delay to prevent the audio buffer from being depleted of the feedback during the active mode of the radio.

In yet another embodiment of the invention, an article includes a storage medium that is accessible by a processor-based system and stores instructions that when executed cause the processor-based system to provide a sidetone path to generate sidetone content in response to audio data. The instructions when executed also cause the processor-based system to disable at least some of the sidetone path during an active mode of a radio and store the sidetone content in an outgoing audio buffer that is operational during the active mode of the radio. The instructions when executed also cause the processor-based system to establish a delay in the sidetone path to prevent the outgoing audio buffer from being depleted of the sidetone content during the active mode of the radio.

Advantages and other features of the invention will become apparent from the following drawing, description and claims.

DETAILED DESCRIPTION

In accordance with embodiments of the invention described herein, a wireless device (a cellular telephone, a personal digital assistant (PDA), a computer with wireless capability, etc.) has a radio frequency (RF) interface, or radio, and relatively "noisy" signal processing circuitry that is turned off when the radio is operating, or in its active mode. The wireless device has a sidetone path that provides sidetone content (described below), which may be played over a speaker system of the wireless device. The sidetone path includes one or more "noisy" signal processing components that are disabled during the active mode of the radio. An audio output buffer of the wireless device, which is not disabled during the active mode, receives sidetone content from the sidetone path. Due to the partial de-activation of the sidetone path during the radio's active mode, it is possible that the audio output buffer may run out of data during the radio's active mode, thereby resulting in an interruption of the sidetone audio that emanates from the wireless device's speaker system. However, as described in more detail below, the sidetone path has a built-in delay to prevent the audio output buffer from being depleted of sidetone content during the active mode of the radio.

A "sidetone" is an audio feedback signal that has its origins in the early days of telephony where speech was communicated over signal wire pairs. Due to the transmission of incoming speech (also referred to as far-end speech) and outgoing speech (also referred to as near-end speech) on the same physical medium, some of the outgoing speech coupled back into the earpiece and hence, the speaker heard his own voice on the handset. This coupled energy, in turn, has since been referred to as the "sidetone."

Figure 1:
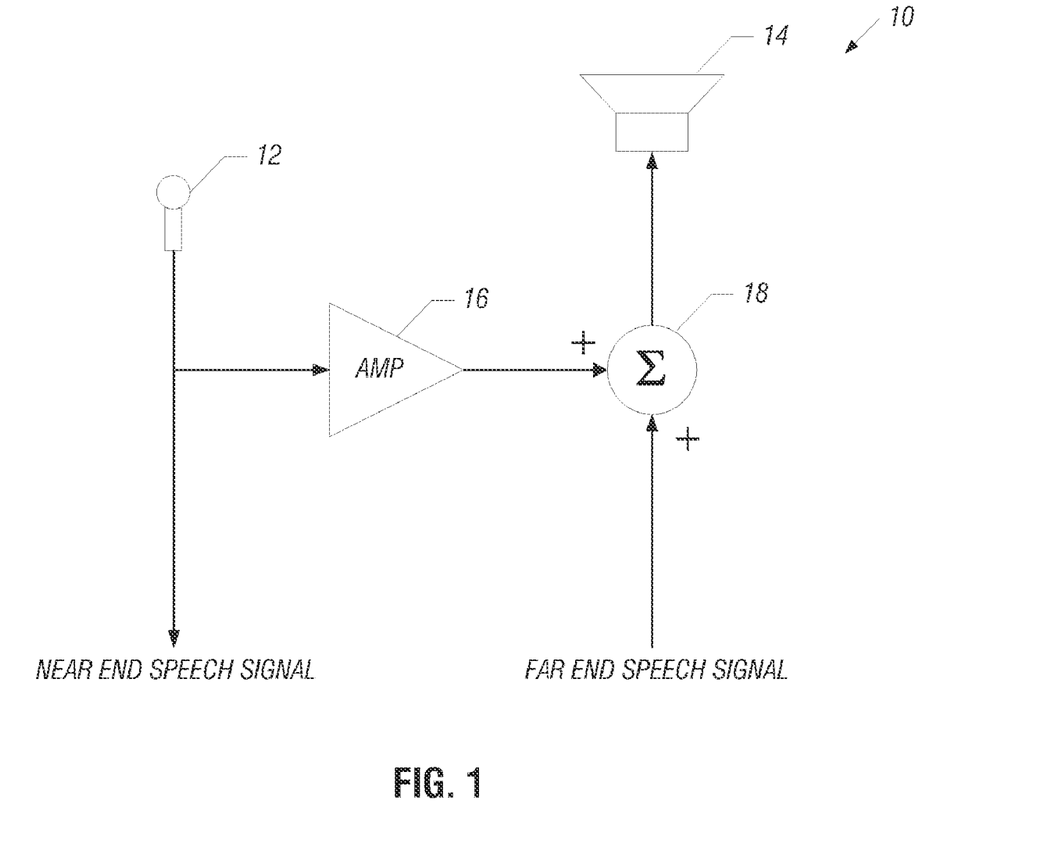
FIG. 1 is an illustration of a system to generate sidetone content according to an embodiment of the invention.

Although modem digital telephones (such as cellular telephones, for example) do not use signal wire pairs, a user of the telephone may still expect to hear the sidetone. As a result, modem telephones may include a sidetone generator in order that the telephone user may receive speech feedback through the telephone's output speaker system. Referring to FIG. 1, as a more specific example, a sidetone generator 10 may include an amplifier 16 that receives a near end speech signal, such as a signal generated by a microphone 12 of the telephone. The amplifier 16 communicates the near end speech signal to an adder 18 that combines the near end speech signal with a far end speech signal to generate the content that is played over a speaker 14 of the telephone.

A challenge in using the above-described sidetone generator in at least some modem wireless devices (such as cellular telephones, for example) is that part of the sidetone generation path may be turned off when a radio of the wireless device is active.

More specifically, the wireless device's radio processes relatively low magnitude signals; and the operation of the radio may be affected by ground noise, inductive coupling, capacitive coupling, etc., which are generated by certain "noisy" digital components (a digital signal processor (DSP), a keyboard scanner, etc.) of the wireless device. The wireless device may therefore use time domain isolation (TDI) to silence certain "noisy" digital circuitry of the device during operation of the radio.

Pursuant to TDI, the radio operates when signal-processing circuitry of the wireless device is inactive, and vice versa. As a consequence, the operation of certain "noisy" digital components does not interfere with the performance of the radio, and vice versa. The radio is generally turned on during RF time slots and turned off during signal-processing time slots. Likewise, the "noisy" digital components are turned on during the signal processing time slots and are turned off during the RF time slots.

More specifically, in accordance with some embodiments of the invention, the RF time slots may generally occur whenever the radio is active; and thus, the wireless device ensures that the radio is not operating concurrently with its noisy digital components, which have the potential of causing noise-related problems with operation of the radio. In accordance with some embodiments of the invention, the wireless device may communicate with a wireless network using a Global System for Mobile communications (GSM) standard that establishes frames and time slots within the frames for the wireless circuit to receive data from and transmit data to the wireless network, although other device standards may be used in accordance with other embodiments of the invention.

The wireless device controls when the RF time slots and signal-processing time slots occur. In accordance with some embodiments of the invention, the RF time slots occur when the wireless device transmits data to the base station, receives data from the base station, or monitors the power of adjacent cells in the wireless network. The RF time slots also occur when the wireless device performs neighbor cell monitoring functions, such as searching for control channels; extracting temporal and frequency information; or decoding control information from the serving base station or a neighbor cell. It is noted that RF time slots may occur while the radio is tuned to the appropriate frequency; and hence, a particular RF time slot may begin shortly before any of the above-described operations and end when the operation is complete. Thus, it is possible that the RF and signal-processing time slots may overlap, in some embodiments of the invention.

More specific details regarding the potential RF and signal-processing time slot overlap, as well as the operation of the wireless circuit with TDI, in accordance with some embodiments of the invention, may be found in U.S. patent application Ser. No. 10/426,042 entitled, "HIGHLY INTEGRATED RADIO-FREQUENCY APPARATUS AND ASSOCIATED METHODS," attorney docket number SILA: 117, which was filed on Apr. 29, 2003, and is hereby incorporated by reference in its entirety.

Figure 2:
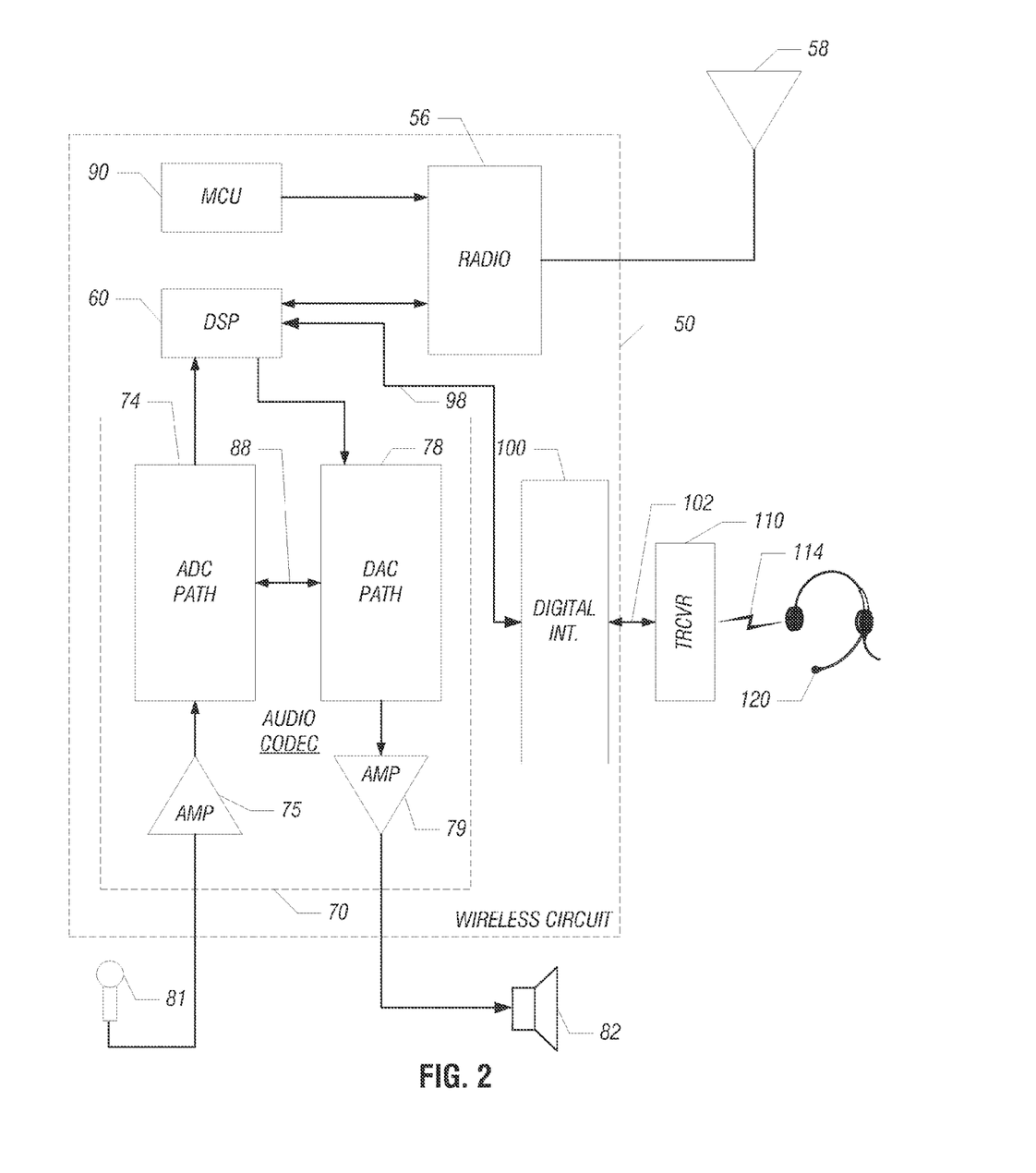
FIGS. 2 and 6 are schematic diagrams of mobile stations according to embodiments of the invention.

Referring to FIG. 2, a mobile station in accordance with embodiments of the invention, includes a wireless circuit 50, an antenna 58, a low range transceiver 110 and a wireless headset 120. The wireless circuit 50 includes an audio codec 70 for purposes of processing speech that is received from a microphone 81 and furnishing an analog audio signal to a speaker 82. In this regard, the audio codec 70 may include, for example, an amplifier 75 that amplifies an analog signal that is provided by the microphone 81 and furnishes the amplified analog signal to an analog-to-digital converter (ADC) path 74. The ADC path 74 converts the analog signal into a digital signal that is provided to an input buffer of a digital signal processor (DSP) 60. The DSP 60 may perform baseband processing of the received audio signal and provide the corresponding baseband signal to a radio 56 of the wireless circuit 50 for purposes of transmitting the audio content over a wireless link to a wireless network via an antenna 58.

The radio 56 may also receive an RF signal from the wireless network, and thus, the DSP 60 may receive a resultant baseband signal from the radio 56, which is encoded with audio content. The DSP 60 may recover the audio content and furnish it to a digital-to-analog converter (DAC) path 78 of the audio codec 70. The DAC path 78 converts the received digital signal from the DSP 60 into an analog signal that is provided to an amplifier 79, which furnishes an amplified signal to drive the speaker 82.

The audio codec 70 may provide a sidetone path (represented schematically in FIG. 2 by a coupling 88) for purposes of communicating sidetone content from the ADC path 74 to the DAC path 78. Thus, for example, an incoming speech signal that is received via the microphone 81 may be coupled at least in part to the outgoing speech signal that results in audible feedback speech being played over the speaker 82.

The above-described sidetone path that is established in the audio codec 70 may not be subject to TDI, in accordance with some embodiments of the invention, as the generation of the sidetone is communicated through circuitry of the ADC 74 and DAC 78 paths, which may not be turned off during TDI-based RF time slots.

However, there are operational modes of the wireless circuit 50, which may circumvent the audio codec 70 and thus, circumvent the above-described sidetone path. For example, in accordance with some embodiments of the invention, audio speech signals may be communicated over a low range communication link between the wireless circuit 50 and the wireless headset 120. More specifically, the wireless circuit 50 may include a digital interface 100 (a pulse code modulation (PCM) interface, for example) that may be connected to the transceiver 110 (a Bluetooth transceiver, for example). The transceiver 110, in turn, establishes a low range wireless link 114 with the headset 120, such as establishing a link that allows a user to communicate speech to and from the wireless circuit 50 in a "hands free" fashion.

For the mode of the wireless circuit 50 in which communication occurs over the low range wireless link 114, a sidetone path other than the sidetone path via the audio codec 70 may be used. This other sidetone path is discussed below. The other sidetone path arises due to the communication of the DSP 60 over a communication path 98 with the digital interface 100, which, via the transceiver 110, establishes communication with the headset 120. The DSP 60, communication path 98 and digital interface 100 form at least part of an all digital sidetone path for the wireless circuit 50 when the wireless device 50 is operating in a mode that uses the wireless headset 120. Because this sidetone path is purely digital, at least a part of the sidetone path may be inactivated during the TDI-based RF time slots. This means that if not for the features of the wireless circuit 50 that are described herein, portions of the sidetone path may be shut down during RF time slots, a shut down that may interrupt the playing of sidetone content over the headset 120.

In accordance with embodiments of the invention that are described herein, the wireless circuit 50 introduces a delay in the above-described digital sidetone path for purposes of bridging the time during which the sidetone path is shut down.

Figure 3:
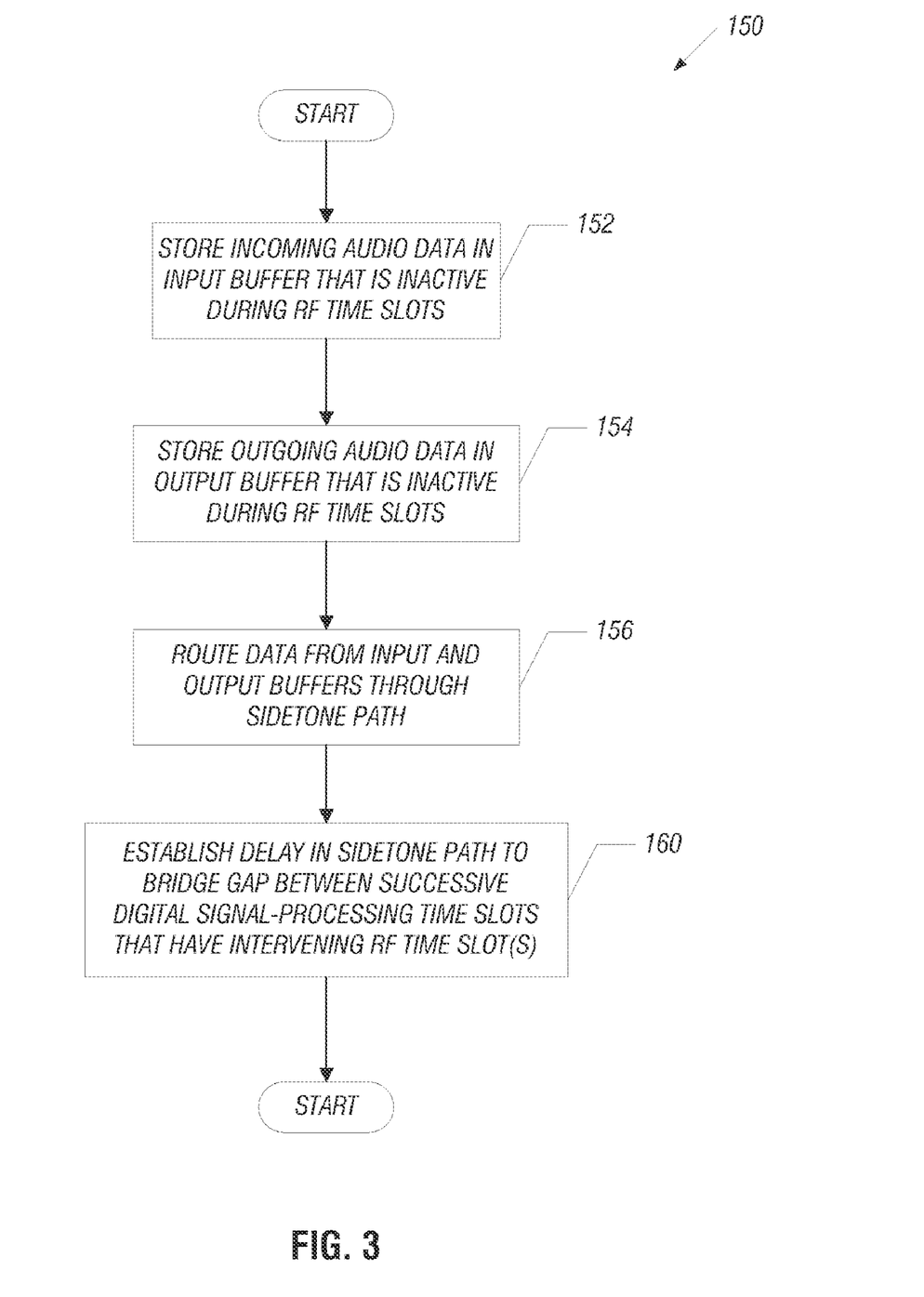
FIG. 3 is a flow diagram depicting a technique to generate sidetone content according to an embodiment of the invention.

Referring to FIG. 3 in conjunction with FIG. 2, to summarize, in accordance with some embodiments of the invention, a technique 150 that may be used to prevent data interruptions in a sidetone path that is at least partially shut down during TDI RF time slots. The technique 150 includes storing (block 152) incoming audio data in an input buffer that may be inactivated, or disabled, during RF time slots. This input buffer may be located in the DSP 60, as further described below. Outgoing audio data is stored in an output buffer that may be also inactivated, or disabled, during the RF time slots, pursuant to block 154. As further described below, this output buffer may also be part of the DSP 60. Data is routed from the input and output buffers through a sidetone path, pursuant to block 156. A delay is established (block 160) in the sidetone path to bridge the gap during an RF time slot(s) (in which some of the sidetone path is disabled, or de-activated) that occur between successive digital signal-processing time slots (in which all of the sidetone path is active).

Referring to FIG. 2, among the other features of the wireless circuit 50, the wireless circuit 50 may also include a microcontroller unit (MCU) 90 that may, for example, execute one or more application programs such as email or calendar application programs for the wireless device 50, as well as controlling the overall operation of the wireless circuit 50.

Figure 4:
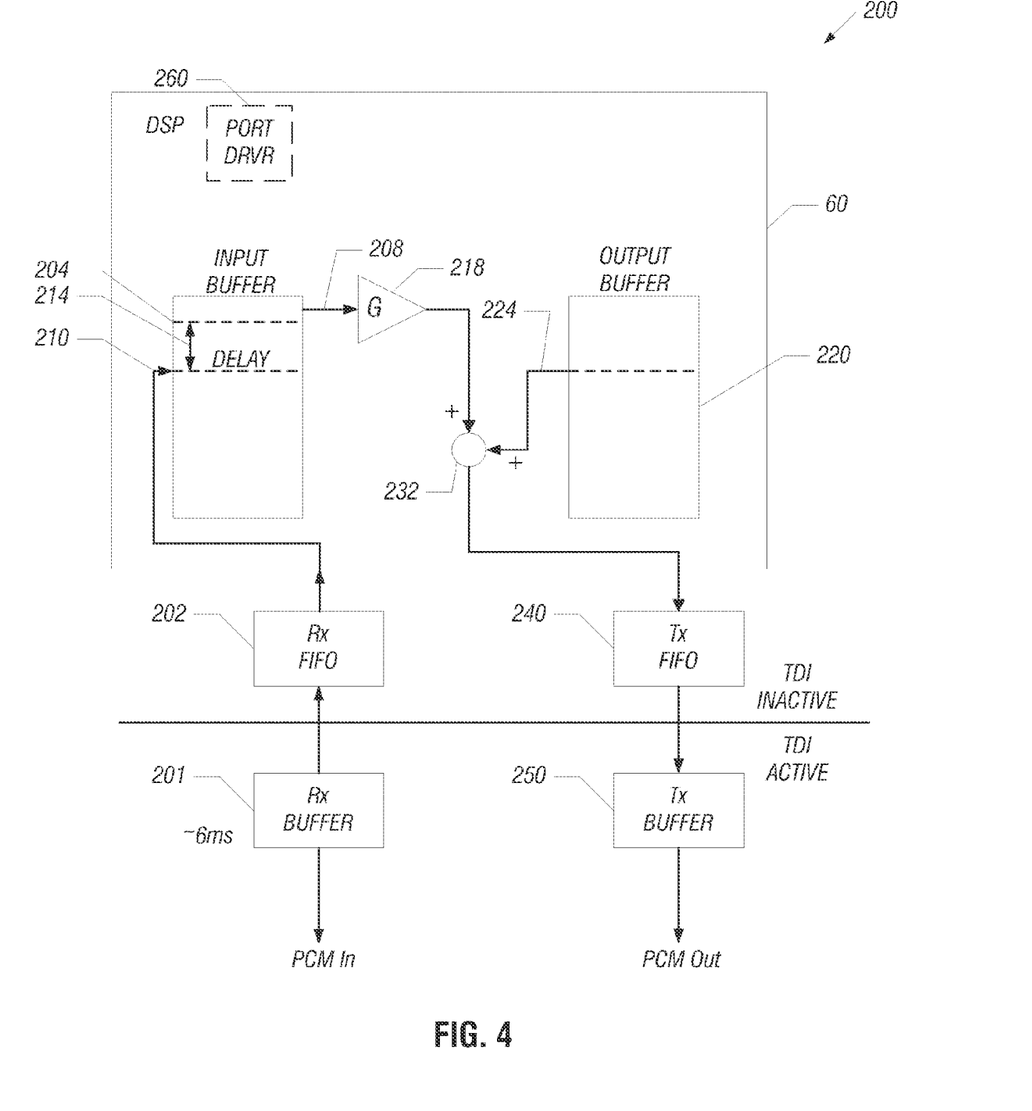
FIG. 4 is a schematic diagram illustrating a sidetone generator according to an embodiment of the invention.

FIG. 4 depicts a sidetone generator 200 in accordance with some embodiments of the invention. As depicted in FIG. 4, the sidetone generator 200 includes the DSP 60, which establishes input 204 and output 220 buffers in the memory of the DSP 60. The input buffer 204 receives incoming audio data from a receive first in first out (FIFO) buffer 202. The receive FIFO buffer 202 may be external or internal to the DSP 60 or may be part of the digital interface 100 (see FIG. 2), depending on the particular embodiment of the invention. The receive FIFO buffer 202 receives its incoming data from a receive buffer 201, which also may be part of the digital interface 100 in accordance with some embodiments of the invention. In general, the input buffer 204 may serve as a FIFO for purposes of buffering the incoming audio data for further processing by the DSP 60.

The output buffer 220 may also be a FIFO buffer, in accordance with some embodiments of the invention. The purpose of the FIFO buffer 220 is to buffer outgoing data that is provided by the DSP 60 to a transmit FIFO buffer 240, a component that may be part of the digital interface 100 in accordance with some embodiments of the invention. The data that is provided by the transmit FIFO buffer 240, in turn, may be provided to a transmit buffer 250 of the digital interface 100, in accordance with some embodiments of the invention.

In general, the receive 201 and transmit 250 buffers may be active during all RF and signal-processing time slots. The DSP 60, input buffer 204, output buffer 220, receive FIFO buffer 202 and the transmit FIFO buffer 240 are disabled during the RF time slots.

For purposes of establishing the sidetone generation path, the input buffer 204 is set up with two pointers 210 and 208. The pointer 210 is an input pointer that, as it name implies, points to the next empty slot inside the input buffer 204. Thus, data that is provided by the receive FIFO buffer 202 is written to the location of the input buffer 204, which is indexed, or "pointed to," by the input pointer 210. The pointer 208 is an output pointer for the sidetone generation path. In this regard, the output pointer 208 points to the next entry to be furnished downstream to the sidetone path.

The input 210 and output 208 pointers are intentionally offset by a predetermined amount of slots in the input buffer 204 to form a fixed delay 214 so that the data that is furnished to the sidetone path always trails the incoming data to the input buffer 204 by a predetermined time delay. For example, in accordance with some embodiments of the invention, the delay 214 may be approximately six milliseconds (ms) but may, more generally, be approximately 2 to 7 milliseconds, depending on the particular embodiment of the invention. It is noted that in general, a delay more than 7 ms produces a signal that may be labeled an "echo" instead of a sidetone.

Thus, to summarize, on the receiving side of the sidetone generator 200, the incoming wireless data to data interface 100 (FIG. 1) is stored in the receive buffer 201. The receive buffer 201 resides in TDI-friendly circuitry and operates continuously during TDI-based RF and digital signal processing time slots. During RF time slots, the receive buffer 201 serves as a reservoir that stores data until the bulk digital circuitry becomes active. During digital signal processing time slots, data is transferred from the receive buffer 201 into the receive FIFO buffer 202. A port driver 260 (resident in the DSP 60, for example), reads data from the receive FIFO buffer 202 and stores the data in the circular input buffer 204, where the data awaits further processing. For the transmit side of the sidetone generator 200, data is read from the output buffer 220 and is written into the transmit FIFO buffer 240. During digital signal processing time slots, data is automatically transferred from the transmit FIFO buffer 240 into the transmit buffer 250. The transmit buffer 250 operates continuously and sources data to the digital interface 100, regardless of the TDI state.

The sidetone generator 200 may also include an amplifier 218 that receives data from the input buffer 204 (at the location pointed to by the output pointer 208) and provides the data to an adder 232 of the generator 200. The adder 232 adds the data from the input buffer 204 to data that is provided at an address of the output buffer 220, pointed to by an output buffer 224. The resultant combined data is then furnished to the transmit FIFO buffer 240.

Figure 5:
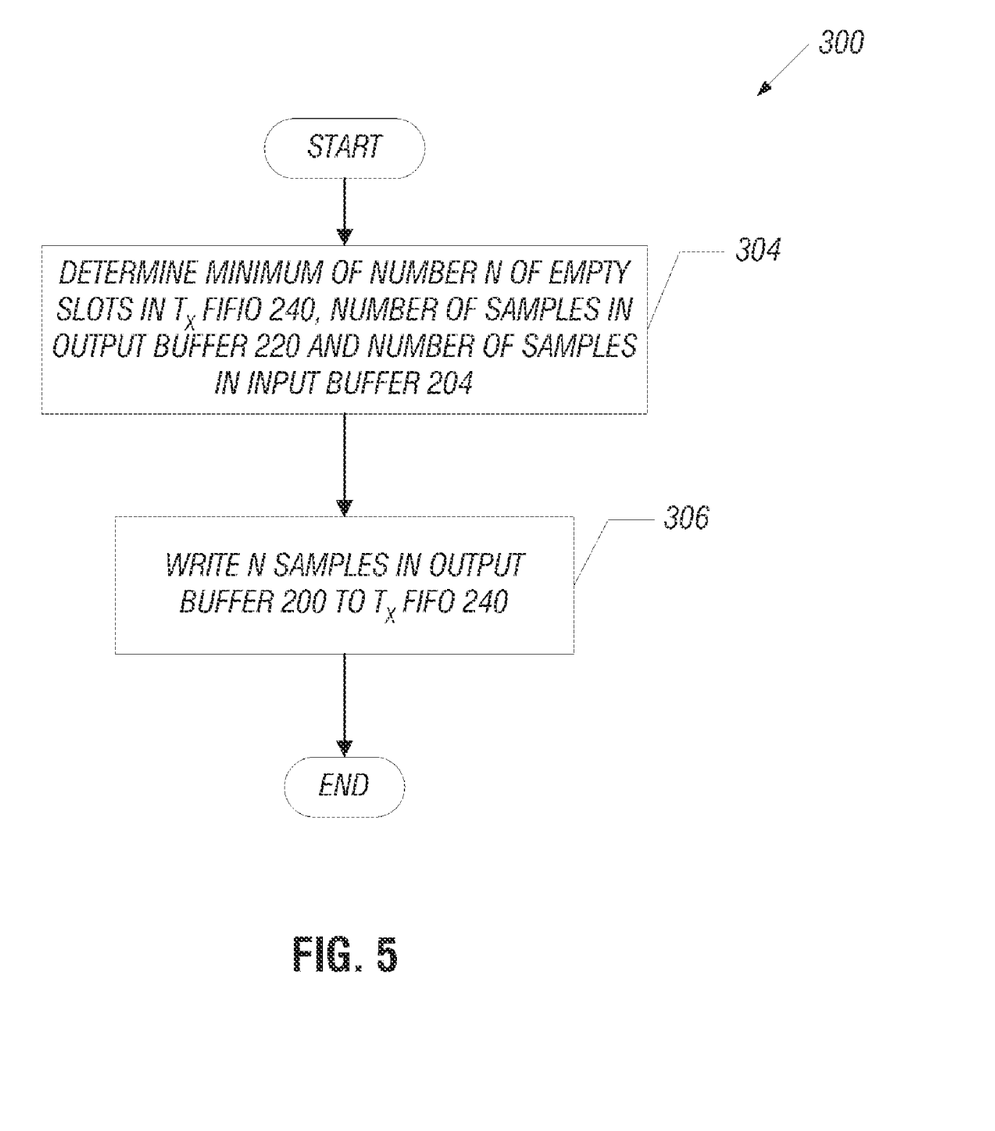
FIG. 5 is a flow diagram depicting a technique to communicate data to a transmission buffer of FIG. 4 according to an embodiment of the invention.

FIG. 5 generally depicts operation of the port driver 260 of the DSP 60, in accordance with some embodiments of the invention. In the following discussion, the operation of the "port driver" means the operation of the DSP 60 when executing instruction code that is part of a port driver routine. In particular, in accordance with some embodiments of the invention, the port driver 260 performs a technique 300 in response to an interrupt that is generated when data is to be transferred from the buffer 202. In response to the interrupt, the port driver 260 determines (block 304) a minimum number N, which represents the minimum of the following: the number of empty slots in the transmit FIFO buffer 240, the number of samples in the output buffer 220; and the number of samples in the input buffer 204. Based on this minimum number N, the port driver 260 writes (block 306) N samples into the output buffer 220 to the transmit FIFO buffer 240. In this manner, the port driver 260 keeps the buffers in the sidetone path as full as possible while avoiding underflow in either of the output buffer 220 or input buffer 204.

Figure 6:
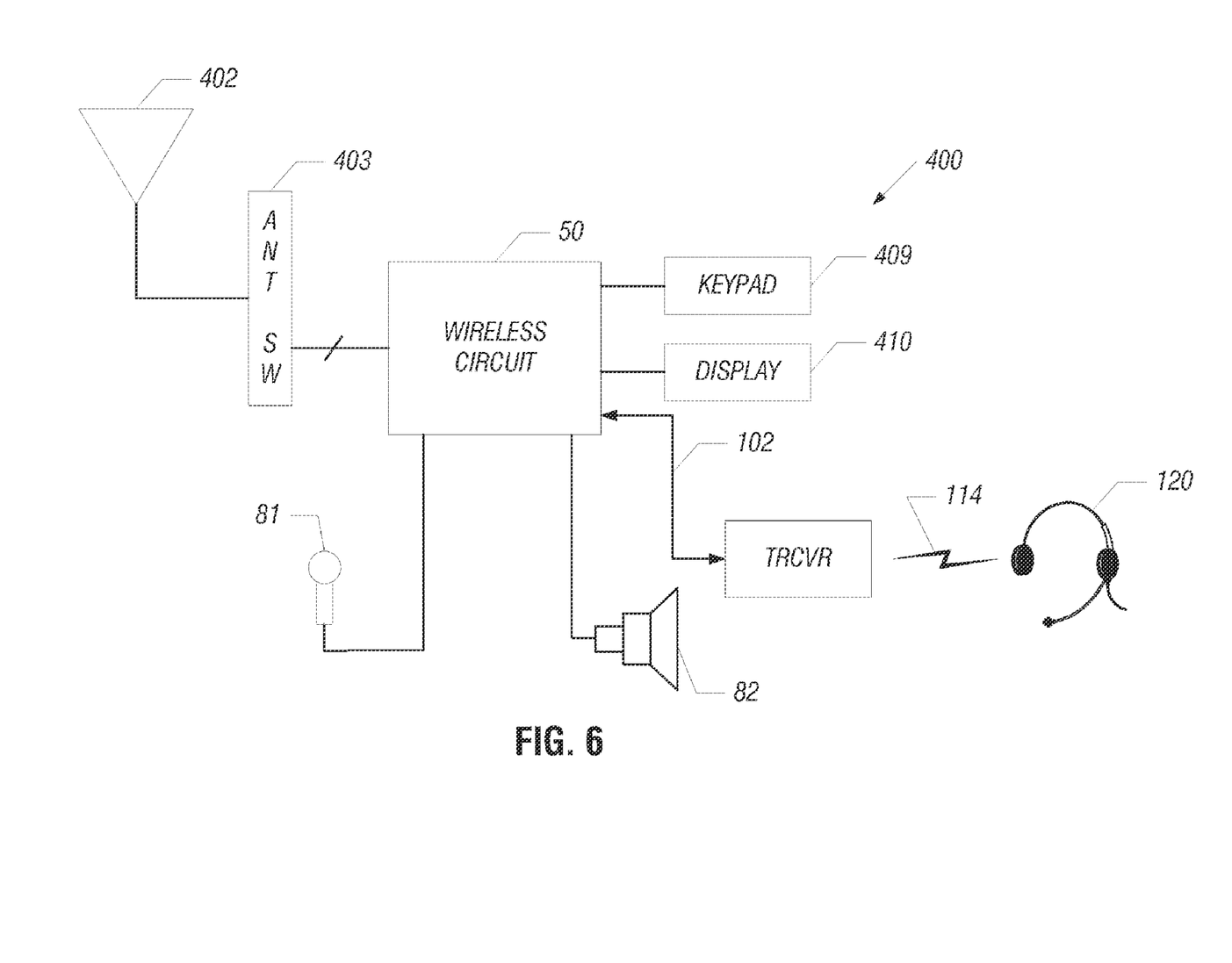

Referring to FIG. 6 in conjunction with FIG. 2, in accordance with some embodiments of the invention, the wireless circuit 50 (see FIG. 2) may be part of a mobile station 400, which in addition to processing speech, provides non-speech related services. The mobile station 400 may form at least part of, as examples, a cellular telephone, a personal digital assistant (PDA), a laptop computer, etc., depending on the particular embodiment of the invention. As depicted in FIG. 6, the wireless circuit 50 may be electrically coupled to an antenna 402 through an antenna switch 403, may receive an input analog audio signal from the microphone 81 and may furnish an analog audio signal to drive the speaker 82. The mobile station 400 may also receive user input via a keypad 409 and drive a display 410, both of which are coupled to the DSP 60 (see FIG. 1) of the wireless circuit 50. The wireless circuit 50 may be fabricated on a monolithic semiconductor die in accordance with some embodiments of the invention. However, in other embodiments of the invention, the wireless circuit 50 may be a single semiconductor package formed from multiple dies, may be formed from more than one semiconductor package, etc. Thus, many variations are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
  providing a sidetone path to generate sidetone content in response to audio data;
  disabling at least part of the sidetone path during an active mode of a radio and wherein at least part of the sidetone path is operational during the active mode of the radio;
  storing the sidetone content that is operational during the active mode of the radio in an outgoing audio buffer; and
  establishing a delay in the sidetone path to prevent the outgoing audio buffer from being depleted of the sidetone content during the active mode of the radio.

2. The method of claim 1, wherein the act of providing the sidetone path comprises:
  providing an audio data input buffer to receive the audio input data, the audio data input buffer being disabled during the active mode of the radio.

3. The method of claim 2, wherein the act of establishing comprises:
  offsetting an input pointer of the audio data input buffer from an output pointer of the audio data input buffer.

4. The method of claim 1, wherein the delay comprises a delay in the range of approximately one to seven milliseconds.

5. The method of claim 1, wherein the act of providing the sidetone path comprises:
  combining the audio data with outgoing data to generate the sidetone content.

6. The method of claim 5, wherein the act of providing the sidetone path further comprises:
  communicating the outgoing data from an output buffer that is disabled during the active mode of the radio.

7. The method of claim 6, wherein the output buffer and audio data input buffer are part of a digital signal processor, the method further comprising:
  disabling the digital signal processor during the active mode of the radio.

8. The method of claim 1, further comprising:
  regulating the storage of data in the outgoing audio buffer based at least in part on a number of samples stored in an input buffer of the sidetone path and a number of samples stored in the outgoing audio buffer.

9. The method of claim 8, wherein the regulating maximizes the number of samples stored in the outgoing audio buffer without creating an underflow condition in the input buffer.

10. A wireless system comprising:
  a radio having an active mode and a de-activated mode;
  a sidetone path;
  an outgoing audio buffer to receive sidetone content from the sidetone path during the active mode; and
  a digital signal processor adapted to:
    generate the sidetone content during de-activated mode and not generate at least part of the sidetone content during the active mode; and
    introduce a delay in the sidetone path to prevent the outgoing audio buffer from being depleted of the sidetone content during the active mode.

11. The wireless system of claim 10, wherein the outgoing audio buffer is adapted to be activated during the active mode of the radio.

12. The wireless system of claim 10, wherein the digital signal processor is adapted to offset an input pointer of an audio data input buffer from an output pointer of the audio data input buffer to establish the delay.

13. The wireless system of claim 10, wherein the delay comprises a delay in the range of approximately one to seven milliseconds.

14. The wireless system of claim 10, wherein the digital signal processor is adapted to combine the incoming audio data with outgoing data to generate the sidetone content.

15. The wireless system of claim 10, further comprising:
  a headset; and
  a transceiver to wirelessly communicate sidetone content between the outgoing audio buffer and the headset.

16. An apparatus comprising:
  an audio buffer; and
  a feedback path adapted to:
    communicate feedback of incoming audio data to the audio buffer during an active mode of a radio;
    be at least partially disabled in response to the active mode of the radio; and
    introduce a delay to prevent the audio buffer from being depleted of the feedback during the active mode of the radio.

17. The apparatus of claim 16, wherein the audio buffer is adapted to be activated during the active mode of the radio.

18. The apparatus of claim 16, wherein the feedback path comprises:
  an input buffer to receive the incoming audio data;
  an input point to identify a first location in the input buffer to store the incoming audio data input in the buffer; and
  an output point to identify a second location in the input buffer to retrieve the incoming audio data from the input buffer,
  wherein an offset of the first and second locations establishes the delay.

19. The apparatus of claim 18, wherein the delay comprises a delay in the range of approximately one to seven milliseconds.

20. The apparatus of claim 18, wherein the feedback path is adapted to combine the incoming audio data with outgoing audio data to generate the feedback.

21. An article comprising a storage medium accessible by a processor-based system and storing instructions that when executed cause the processor-based system to:
  provide a sidetone path to generate sidetone content in response to incoming audio data during an active mode of a radio;
  disable at least some of the sidetone path during the active mode of the radio;
  store the sidetone content that is operational during the active mode of the radio in an outgoing audio buffer; and
  establish a delay in the sidetone path to prevent the outgoing audio buffer from being depleted of the sidetone content during the active mode of the radio.

22. The article of claim 21, the storage medium storing instructions that when executed by the processor-based system cause the processor-based system to:

disable an audio data input buffer that receives the incoming audio data in response to the active mode of the radio.

23. The article of claim 22, the storage medium storing instructions that when executed by the processor-based system cause the processor-based system to:

offset an input pointer of the audio data input buffer from an output pointer of the audio data input buffer to establish the delay.

* * * * *